United States Patent Office 2,866,716
Patented Dec. 30, 1958

2,866,716

PROCESS FOR MODIFYING THE SURFACE OF A SILICA SUBSTRATE HAVING A REACTIVE SILANOL SURFACE

Edward C. Broge, Wilmington, Del., assignor to E. I. du Pont de Nemours and Company, Wilmington, Del., a corporation of Delaware No Drawing. Application October 18, 1955
Serial No. 541,305

7 Claims. (Cl. 106—308)

This invention relates to processes in which a siliceous solid having surface silanol groups but substantially no surface alumina groups is activated by reducing the specific hydroxylated surface area of the solid to less than 85 percent of its specific surface area, and the activated solid is mixed with a hydrocarbon which is terminally-unsaturated, whereby chemical reaction occurs to form an organo-modified product of the siliceous solid characterized by having a surface layer of discrete organic groups attached to the siliceous surface through primary chemical bonds.

The siliceous solid treated can be any of the materials used as substrates for esterification according to U. S. Patent 2,657,149, issued October 27, 1953, to Ralph K. Iler, being particularly described in said patent at column 2, line 20, to column 12, line 20. Thus the siliceous material can consist of a material such as colloidal clay, glass fibers, metal silicates, or other siliceous substances upon which a surface of silica has been formed, either by leeching out metal ions as by acid treatment, or by deposition of silica thereon. Preferably the substrate treated is made up of amorphous silica and thus can consist of a conventional silica gel, a silica aerogel, or a synthetically prepared aggregate of silica particles of controlled size and degree of coalescence. The essential feature is that the siliceous surface contained silanol, that is, SiOH groups.

It is necessary that the siliceous surface be thoroughly freed from traces of aluminum ions and preferred that it is free of other metal ions and other inorganic impurities, and effectively purged of traces of organic impurities. This is necessary for highest possible coverage by organic groups, and to avoid catalytic action upon the unsaturated hydrocarbons.

The siliceous solid must be activated prior to reaction with the terminally-unsaturated hydrocarbon. Activation is accomplished by reducing the specific hydroxylated surface area of the solid to less than 85 percent of the specific surface area. This can be done either by heating the silica at an elevated temperature for a suitable time or by adding a suitable catalyst, such as a fluoride, which replaces some of the surface silanols with fluoride ions.

Activation by heating is conveniently carried out, for instance, in a muffle furnace. Time and temperature of heating is critical, the time and temperature of heating being such that the number of surface silanol groups on the siliceous solid is substantially decreased from that corresponding to a monolayer—that is, less than about 8 OH groups per square millimicron of surface. The decrease is such that the specific hydroxylated surface area of the solid is less than 85 percent of the specific surface area. It is preferred, however, that the number of surface silanol groups be reduced no lower than about 2 per square millimicron of surface.

In no case should the heating be at a temperature high enough to allow sintering of the siliceous solid.

The preferred temperature for heat activation is 400 to 600° C.

The number of surface silanol groups per unit area can be calculated from the loss on ignition. To do this, the siliceous material is heated about 1000° C. and the loss in weight is related to the number of moles of water produced. One molecule of water is produced by the condensation of each pair of silanol groups. The specific surface area of the original aggregates is determined by the nitrogen adsorption method. From this data the average number of surface silanol groups per unit of surface area, that is, the specific hydroxylated surface area, is calculated. Alternatively, the calculation may be made from the methyl red dye adsorption described in the above mentioned Iler Patent 2,657,149.

The exact extent of heat-activation which is preferable is frequently a function of a double bond activity of the organic compound used in a subsequent treatment. For example, with a relatively inactive material such as octene-1, surface dehydration to the extent of about 75–80% of the available SiOH groups at 400–600° C. is of the proper order of activity.

The surface of the siliceous solid can be activated by adding small amount of catalysts instead of by the heat treatment just described. Typical of such catalysts are ammonium fluoride, ammonium bifluoride, and hydrogen fluoride. These promote reaction of even fully hydrated silica with saturated hydrocarbons such as octene-1.

After activation the siliceous solid is mixed with the terminally-unsaturated hydrocarbon, whereby chemical reaction occurs and the hydrocarbon is bound to the siliceous solid through primary chemical bonds. If heating has been the method used for activation of the siliceous solid, the solid should be cooled somewhat before mixing with the hydrocarbon and care should be taken to prevent the admission of moisture.

The hydrocarbon used in the reaction can be any terminally-unsaturated hydrocarbon molecule in which carbon-to-carbon unsaturation occurs between a terminal carbon and a carbon adjacent to it. Cyclic unsaturation, such as occurs in the benzene ring does not answer this description, although phenyl substitution on the hydrocarbon is not precluded. The unsaturation can be ethylenic or acetylenic. Particularly preferred are such unsaturated hydrocarbons as ethylene, normal-octene, butadiene, triisobutylene, diisobutylene, and n-propylene.

Unsaturated hydrocarbons, such as octene-2, in which the carbon atoms joining the double bond have only one hydrogen atom attached, are not preferred.

It is preferred to avoid using as the unsaturated organic compound a hydrocarbon which polymerizes easily. Easily polymerized materials tend to coat the product with a multi-molecular layer of polymer. Such polymer-coated products are not within the spirit of the present invention, wherein the products are desired to be primarily inorganic in nature with discrete organic groups attached to the siliceous substrate by primary chemical bonds. However, if it is desired to react the surface of a siliceous particle with an easily polymerizable hydrocarbon, this may be done according to the present invention by diluting said hydrocarbon with an inert solvent to minimize the tendency of the hydrocarbon to interpolymerize.

It is sometimes preferred to avoid using as the unsaturated hydrocarbon a material containing a multiplicity of polar substituent groups. Polar configurations reduce the organic compatibility of the product. Obviously, if organic compatibility is not a requirement of the product to be produced, highly polar unsaturated hydrocarbons can be used without prejudice.

The rate and extent of the reaction between the siliceous solid and the unsaturated hydrocarbons are increased if the hydrocarbon is in the liquid state when mixed with the siliceous solid. If necessary, liquefaction can be accomplished by compression and cooling. Nevertheless, prolonged reaction times in vapor-solid mixtures, as, for instance, when the gaseous hydrocarbon is passed continuously over a body of the siliceous solid, will also lead to appreciable degrees of surface reaction. In some instances it is desirable to utilize a dilute solution of the unsaturated compound in an inert solvent such as paraffin hydrocarbons, aromatic hydrocarbons, carbon tetrachloride, carbon disulfide, and the like.

The temperature and time of mixing of the hydrocarbon and siliceous solid to obtain reaction depends upon the reactivity of the silica, the presence of catalysts, and the nature, concentration, and physical state of the unsaturated hydrocarbon. Reaction temperatures from 75–300° C. are preferred. Above 300° C. certain of the organic-coated silicas are subject to danger of decomposition. Also at temperatures above 300° C. the tendency for polymerization of the organic compound with itself is increased.

After the reaction between the siliceous solid and the unsaturated hydrocarbon has been completed, the product is recovered from any excess of the hydrocarbon. This can be done by filtering it off, or by evaporating off the hydrocarbon if it is volatile, or by washing it out with a suitable low-boiling organic reagent such as benzene, acetone, methylethylketone, or ether. After such washing, the product can be dried at elevated temperatures, either in air or in vacuum. With some products the temperature of any air drying should be held below about 120–130° C. to avoid oxidation.

The products of this invention are free-flowing powders. They are organophilic and may also be hydrophobic. By organophilic is meant that when placed in a mixture of water and a water-insoluble organic liquid such as n-decane, they wet into the organic liquid preferentially. Many of the products do not wet into water even after prolonged exposure. The products have substantially the same specific surface area (as determined by nitrogen adsorption) as the siliceous solid had before reaction with the organic compound. In the products produced by processes wherein the organic compound is an unsaturated hydrocarbon, the hydroxylated surface areas as determined by adsorption of methyl red dye are less than the hydroxylated surface areas of the original siliceous solid.

The products, including those with a high order of hydrolytic stability, can be hydrolyzed by boiling with dilute mineral acids. In such cases the organic coating is usually recoverable as an alcohol, so that the net effect of the sequence of reactions is to hydrate the ethylenic unsaturation which was originally present in the organic molecule. Unexpectedly, a primary rather than a secondary alcohol is produced by such a sequence of reactions, in contrast to most processes wherein a water molecule is added across a double bond.

The invention will be better understood by reference to the following illustrative examples.

Example 1

An aquasol of dense, spherical, 17 millimicron amorphous silica particles, containing 30% silica was deionized by passing it through a body of cation and anion exchange resin. The deionized sol was allowed to stand until it gelled. The hydrous gel obtained was then dried for 16 hours at 110° C. and ground in a hammermill of the Mikropulverizer type to give a free-flowing powder. The product was practically pure. It contained 0.03% sodium, 0.0065% sulfate, no chloride, 0.13% non-siliceous ash, less than 0.001% each of aluminum, copper, iron, and silver, and less than 0.01% of titanium. The specific surface area as determined by nitrogen adsorption was 185 square meters per gram (m.$^2$/g.) and the specific hydroxylated surface area as determined by methyl red dye adsorption was found to be 175±3 m.$^2$/g. In this and the other examples this material is designated as "material A."

A 10 gram portion of material A was refluxed at 123° C. for 2½ hours with 133 cc. of octene-1. No reaction occured between the silica and the octene-1. The product was separated from excess octene-1 by filtration and was dried for 2 hours at 120° C. It was hydrophilic and organophobic after the treatment.

Another portion of material A, about 3 grams in weight, was activated by heating for one hour at 600° C. in a muffle furnace, then cooling to room temperature in the absence of atmospheric moisture. After this heat treatment, the specific hydroxylated surface area measured by methyl red adsorption was 100 m.$^2$/g., or 57.2% of its original value. This siliceous solid was refluxed at 123° C. for 2½ hours with 15 cc. of octene-1. The product was filtered off and dried at 120° C. It was quite hydrophobic. The product was then washed exhaustively with acetone and dried for six more hours at 120° C. After this treatment, the product was still extremely hydrophobic.

Example 2

A 5 gram portion of material A was heat-activated by heating it to 600° C. in a muffle furnace for one hour and cooling it in the absence of atmospheric moisture. This siliceous solid was then mixed with 50 cc. of octene-1. This mixture was heated at 123° C. under reflux for 2½ hours. After this treatment, the product was found to be very organophilic and hydrophobic, that is, it preferred butanol to water in a two-phase system of butanol and water and it would not wet into water alone. The percentage carbon was found to be 3.52 which corresponds to 126 octene molecules/100 square millimicrons of silica surface, and the specific hydroxylated surface area as determined by adsorption of methyl red dye was found to be 14.8 m.$^2$/g.

Example 3

A quantity of triisobutylene was purified by distillation, retaining as product a cut boiling at 160° C. A portion of heat-activated silica prepared as in Example 2 was mixed with the purified triisobutylene and refluxed for four hours at 160° C. The silica was recovered by filtration, washed exhaustively with ether, and dried at 120° C. The product was extremely hydrophobic. It hydroxylated surface area was 12.5 m.$^2$/g. and the percent of carbon was 3.28. The represents a degree of coverage of about 0.85 triisobutylene molecules/square millimicrons of siliceous surface. It is significant that such a low degree of coverage gives a hydrophobic product.

Example 4

A quantity of material A was heat-activated by heating at 610° C. for one hour. It was poured directly into 100 cc. of diisobutylene. The mixture was boiled for 2 hours at 103° C. to effect reaction. The product was filtered off, washed, and dried for 16 hours at 155° C.

The dried product was organophilic, in that it preferred to be wetted by benzene in a two-phase benzene-water mixture. The hydroxylated surface area was 71.3 m.$^2$/g. and the carbon analysis 0.72%, corresponding to a coverage of 0.3 diisobutylene molecules/square millimicron of silica surface.

Example 5

The procedure of Example 4 was repeated with the exception that the slurry of silica in diisobutylene was heated to 200° C. in a closed, sealed bomb for 2 hours. The product was filtered off, washed, and dried. It was moderately hydrophobic. By analysis, 3.46% carbon was found on the silica, corresponding to 1.45 diisobutylene groups/square millimicron of surface.

Example 6

Separate 3 gram portions of material A were heat-activated at various temperatures, treated with 50 cc. portions of octene-1, and refluxed for about 2½ hours at the boiling point (123° C.). The products of the reaction were filtered off, washed with ether, and dried at 120° C. Before treatment with the octene, samples of each portion were subjected to a determination of the number of surface hydroxyl groups present. The following data were obtained:

| Activation Temp., °C. | Ignition Loss, percent | Silanol No., OH/mu$^2$ | Dye Area, m.$^2$/g. | Percent Carbon | Degree of Coverage, Octene/mu$^2$ | Character of Product |
|---|---|---|---|---|---|---|
| 120 | 3.35 | 12.4 | 77.3 | 1.90 | 0.67 | hydrophilic. |
| 300 | 1.69 | 6.4 | 64.7 | 2.19 | 0.77 | Do. |
| 460 | 1.09 | 4.1 | 28.5 | 2.65 | 0.94 | organophilic. |
| 600 | 0.68 | 2.5 | 14.8 | 3.52 | 1.26 | hydrophobic. |
| 700 | 0.52 | 2.0 | 17.4 | 2.81 | 1.01 | hydrophobic. |
| 780 | 0.37 | 1.4 | 20.5 | 2.62 | 0.94 | organophilic. |

Example 7

A portion of material A was activated by heating it in the presence of air to 600° C. for 40 minutes. The activated siliceous solid was stirred into a solution of isobutylene in xylene. This mixture was boiled under reflux for 2 hours at 132° C. with isobutylene bubbling through the solution. At the end of this time a portion of the silica, surface reacted with the isobutylene, was separated by filtration, washed with ether, and vacuum dried at 102° C. for one hour. The product was an organophilic powder which preferred to be wet by butanol in a two-phase butanol-water system.

Example 8

A 5 gram portion of material A was activated by passing air through it for 1½ hours in a fluidized bed at 550° C. After the activation treatment the reactor was transferred to a bath at 180° C. and diisobutylene vapor was swept through the bed on a nitrogen stream. A total of 50 cc. of diisobutylene was added at the rate of 1 cc. per minute.

A pure white, free-flowing powder was obtained as product. It was initially very hydrophobic, but after drying in air at 130° C. it lost this property. Analysis showed that it contained only 0.94% carbon, indicating appreciable oxidation under the drying conditions.

Example 9

A 50 gram portion of material A was activated by heating for 2 hours in a large muffle furnace at 600° C. The activated silica was refluxed for 2½ hours with 500 cc. of octene-1 to give after washing and drying, an extremely organophilic powder. This powder was refluxed for 4 hours in distilled water, and the mixture was extracted with several portions of ether. The ether washings were dried overnight over anhydrous calcium sulfate, and subjected to infrared analysis. By this method the spectrum of the hydrolysis product of the octene-treated silica was found to correspond closely with that of octanol-1. A small amount of the hydrolysis product was reacted with 3,5-dinitrobenzoyl chloride to give a compound which melted between 55 and 60° C. The compound formed by the reaction of pure octanol-1 and 3,5-dinitrobenzoyl chloride melted at 61° C.

I claim:

1. A process comprising activating an inorganic, super-colloidal siliceous solid having a surface consisting essentially of silica containing surface silanol groups but substantially no surface bound aluminum, by heating it to a temperature in the range from 300 to 700° C. until its specific hydroxylated surface area is reduced to less than 85 percent of its specific surface area but not below the point where there are about 2 surface silanol groups per square millimicron of surface, and thereafter effecting contact between it and a terminally-unsaturated hydrocarbon, whereby chemical reaction occurs to form an organo-modified product of the siliceous solid, characterized by having a surface layer of discrete organic groups attached to the siliceous surface through primary chemical bonds.

2. A process comprising heating an inorganic, super-colloidal siliceous solid having a surface consisting essentially of silica containing surface silanol groups but substantially no surface bound aluminum, at a temperature in the range from 300 to 700° C., to reduce its specific hydroxylated surface area to less than 85 percent of its specific surface area but not below the point where there are about 2 surface silanol groups per square millimicron of surface, whereby to activate it, and thereafter mixing it with a terminally-unsaturated hydrocarbon, whereby chemical reaction occurs to form an organo-modified product of the siliceous solid, characterized by having a surface layer of discrete organic groups attached to the siliceous surface through primary chemical bonds.

3. A process comprising heating an inorganic, super-colloidal siliceous solid having a surface consisting essentially of silica containing surface silanol groups but substantially no surface bound aluminum to a temperature of from 400 to 600° C. to reduce its specific hydroxylated surface area to less than 85 percent of its specific surface area but not below the point where there are about 2 surface silanol groups per square millimicron of surface and thereby to activate it, and thereafter mixing it with a terminally-unsaturated hydrocarbon, whereby chemical reaction occurs to form an organo-modified product of the siliceous solid, characterized by having a surface layer of discrete organic groups attached to the siliceous surface through primary chemical bonds.

4. A process comprising heating an inorganic, super-colloidal siliceous solid having a surface consisting essentially of silica containing surface silanol groups but substantially no surface bound aluminum to a temperature of from 300 to 700° C. to lower the proportion of said silanol groups into the range of from 2 to 8 per square millimicron of surface, and thereby activate the solid, and mixing the activated solid with a terminally-unsaturated hydrocarbon whereby chemical reaction occurs to form an organo-modified product of the siliceous solid, characterized by having a surface layer of discrete organic groups attached to the siliceous surface through primary chemical bonds.

5. A process comprising, heating, at a temperature of from 400 to 600° C., an inorganic, siliceous solid having surface silanol groups but substantially no surface bound aluminum to lower the proportion of said silanol groups into the range of from 2 to 8 per square millimicron of surface, and thereby activate the solid, and mixing the activated solid with a terminally-unsaturated hydrocarbon, whereby chemical reaction occurs to form an organo-modified product of the siliceous solid, characterized by having a surface layer of discrete organic groups attached to the siliceous surface through primary chemical bonds.

6. A process comprising heating an inorganic, super-colloidal, siliceous solid having a surface consisting essentially of silica containing surface silanol groups but substantially no surface bound aluminum, at a temperature of from 400 to 600° C. until the proportion of said silanol groups is from 2 to 8 per square millimicron of surface, whereby the solid is activated, and thereafter mixing the activated solid with a hydrocarbon which has terminal, ethylenic unsaturation, whereby chemical reaction occurs to form a hydrocarbon-modified product of the siliceous solid, characterized by having a surface layer of discrete hydrocarbon groups attached to the siliceous surface through primary chemical bonds.

7. A process comprising heating particulate, super-colloidal, amorphous silica at a temperature of from 400 to 600° C. until the proportion of surface silanol groups on the silica is from 2 to 8 per square millimicron of surface, whereby the silica is activated, and thereafter mixing the activated solid with a terminally-unsaturated hydrocarbon, whereby chemical reaction occurs to form a hydrocarbon-modified silica characterized by having a surface layer of discrete hydrocarbon groups attached to the silica surface through primary chemical bonds.

References Cited in the file of this patent

UNITED STATES PATENTS

| | | |
|---|---|---|
| 2,657,149 | Iler | Oct. 27, 1953 |
| 2,680,696 | Broge | June 8, 1954 |
| 2,739,077 | Goebel | Mar. 20, 1956 |
| 2,742,378 | Grotenhuis | Apr. 17, 1956 |